United States Patent [19]

Griffin

[11] 4,431,354

[45] Feb. 14, 1984

[54] LEAD SCREW ASSEMBLY

[75] Inventor: Charles K. Griffin, Auburn, N.Y.

[73] Assignee: Carrier Corporation, Syracuse, N.Y.

[21] Appl. No.: 298,847

[22] Filed: Sep. 3, 1981

[51] Int. Cl.³ ............................................. F16B 39/00
[52] U.S. Cl. .................................... 411/301; 411/411;
411/427; 74/424.8 R
[58] Field of Search ................................ 411/901–908,
411/301, 366, 378, 411, 427, 428; 403/343, 291;
74/DIG. 10, 424.8 R

[56] References Cited

U.S. PATENT DOCUMENTS 2,900,435  8/1959  Curtiss ............................ 411/301 X
4,114,505  9/1978  Loeser ............................. 411/903 X
4,175,605 11/1979  Johnson ........................... 411/301 X

FOREIGN PATENT DOCUMENTS 684846 12/1952 United Kingdom .
731275  6/1955 United Kingdom .
1169577 11/1969 United Kingdom .
2070560  9/1981 United Kingdom .

OTHER PUBLICATIONS

The Magazine, "Fasteners", dated Dec. 15, 1953, p. 10.
Kerk Lead Screw Assemblies Data Sheet from Motion Products Inc. of Nashua, N.H.

Primary Examiner—Wayne L. Shedd
Attorney, Agent, or Firm—David J. Zobkiw

[57] ABSTRACT

A lead screw is coated with Teflon to protect the screw from a high humidity atmosphere and to eliminate the need for lubricants which would tend to collect corrosion products and form a grinding compound. A nylon nut is used in combination with the Teflon coated screw since the nylon deforms to load all of the threads whereby the Teflon coating is not peeled off.

2 Claims, 3 Drawing Figures

LEAD SCREW ASSEMBLY

BACKGROUND OF THE INVENTION

Conventional heavy-duty lead screw assemblies consist of a hard steel screw with an acme thread and a metal, such as bronze, nut with a matching thread. An acme thread usually has a built-in clearance so that there can be relative movement between the screw and the nut when the screw goes from a "pushing" to a "pulling" mode or from a loaded to an unloaded mode. Lubricant tends to collect in the clearance spaces and is partially extruded from one clearance into another as the load direction changes so that the screw and nut are lubricated. While this combination of materials is ordinarily satisfactory, it was found to fail under certain combinations of conditions.

In a situation where a lead screw assembly is used to position a base carrying a variable sheave motor for the fan of a central air conditioning system, the load is unidirectional and continuous since spring tension is employed to maintain the proper tension on the fan belt. The lead screw acts against the spring tension of the variable sheave to move the motor base in one direction and retards the return movement of the spring in the opposite direction so that the lead screw is always opposing the spring tension of the variable sheave and the same sides of the screw threads are always in engagement when the device is in operation. Depending upon the axial length of the nut and the stroke of the lead screw, lubrication of the contacting portion of the screw thread may be possible as it is withdrawn from the nut, but it would have to be done more frequently than normal maintenance practice would indicate.

The problem of lubrication in the case of continuous unidirectional loading is compounded by the location of the variable sheave motor, and therefore the lead screw assembly, in proximity to the evaporator coil of the central air conditioning system which results in a high humidity environment. The combination of poor lubrication and high humidity produces corrosion and accelerated wear of the lead screw assembly. Corroded metal in the form of rust is broken off of the threads and is trapped by the lubricant and acts as an abrasive causing accelerated wear and failure of the parts. This situation exists for various standard combinations of parts such as steel lead screws in combination with bronze, brass, cast iron and nylon nuts, all of which were subject to failure in this manner. Stainless steel, which may appear to offer a solution, is subject to galling, the condition that makes it unsuitable for use as a bearing, and it too fails from excessive wear. Plastic is not suitable since it lacks the necessary rigidity for use as a lead screw in the length required.

SUMMARY OF THE INVENTION

A steel lead screw is coated with a 0.8 to 1.2 mil coating of a solid polymer such as polytetrafluoroethylene which is sold under the trademark of Teflon and is used in combination with a nylon drive nut to form a lead screw assembly which is capable of functioning reliably in a high humidity environment under unidirectional loading.

It is an object of this invention to provide a lead screw assembly suitable for use in a high humidity environment under heavy, unidirectional loading.

It is a further object of this invention to provide a lead screw assembly which does not require lubrication. These objects, and others as will become apparent hereinafter, are accomplished by the present invention.

Basically, the present invention coats a lead screw with Teflon to protect the screw from the atmosphere to avoid corrosion and to eliminate the need for lubricants which collect the products of corrosion, grit and other abrasive materials and results in accelerated wear. A nylon drive nut is used in combination with the Teflon coated screw and, since nylon has a lower modulus of elasticity than the steel of the screw, it has enough stretch to spread out the load over the threads and therefore does not peel off the Teflon coating as would a metal nut.

BRIEF DESCRIPTION OF THE DRAWINGS

For a fuller understanding of the present invention, reference should now be made to the following detailed description thereof taken in conjunction with the accompanying drawings wherein.

DESCRIPTION OF THE PREFERRED EMBODIMENT

Figure 1:
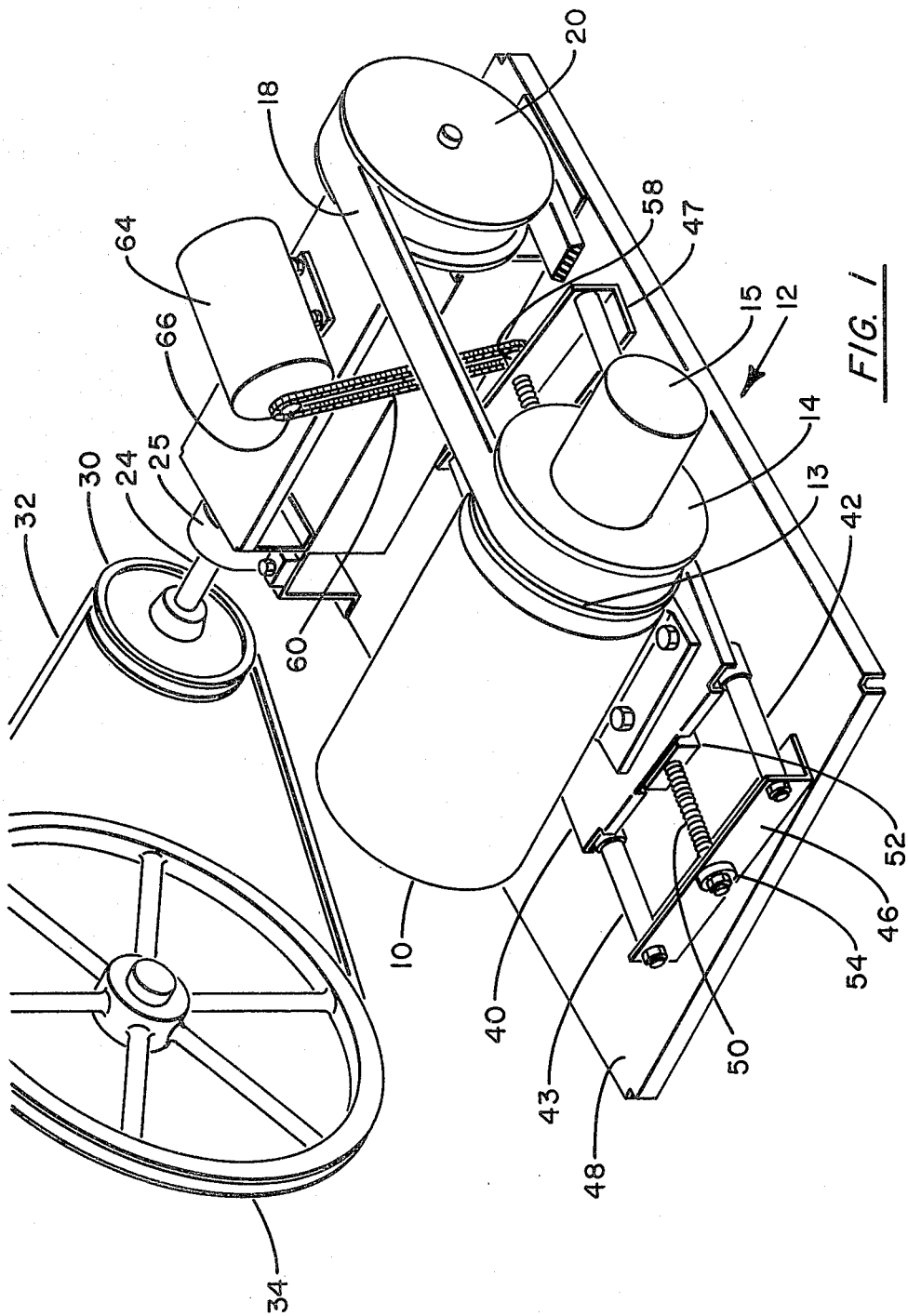
FIG. 1 is a pictorial view of a portion of a variable sheave fan device employing the lead screw assembly of the present invention.

In FIG. 1, the numeral 10 designates a fan drive motor for the fan (not illustrated) of a central air conditioning system. Fan drive motor 10 has a variable sheave 12 made up of a fixed face 13 and a variable face 14. A spring can 15 is attached to variable face 14 and contains a spring which tends to bias face 14 against face 13. Variable speed belt 18 operatively engages faces 13 and 14 as well as companion sheave 20 which is secured to one end of jackshaft 24. Jackshaft 24 is supported by bearings 25 and has a transfer sheave 30 located on the opposite end from companion sheave 20. Transfer sheave 30 is operatively engaged with fan drive belt 32 which is also operatively engaged with the fan sheave 34.

Fan drive motor 10 is mounted on movable motor base 40 which is slidably supported by guide rails 42 and 43 which are secured to fixed angle supports 46 and 47 which are secured to base 48. Base lead screw 50 has a rolled acme thread and is threadably engaged with drive nut 52 which is secured to base 40. One end of screw 50 is received in thrust bearing 54 and the other end has a sprocket 58 which is operatively engaged with chain 60. Base drive motor 64 is operatively connected to chain 60, and hence lead screw 50, via sprocket 66 and is driven in response to a change in a sensed system condition such as temperature.

The radius of engagement between faces 13 and 14 of variable sheave 12 and variable speed belt 18 dictates the speed of the fan (not illustrated). The spring bias exerted on face 14 forces face 14 toward face 13 and tends to force belt 18 to the greatest radius which results in the greatest fan speed. The force on belt 18 due to the spring bias on face 14 exerts a force on motor 10 and thereby motor base 40 tending to draw motor base 40 toward jackshaft 24. Lead screw 50 engages nut 52 to tend to hold motor base 40 away from jackshaft 24. Responsive to sensed changes in system conditions, base drive motor 64 causes lead screw 50 to rotate to either move motor base 40 away from jackshaft 24 and to force faces 13 and 14 further apart or to retard movement of the motor base 40 toward jackshaft 24 under the influence of the spring bias acting on face 14 and to permit face 14 to move closer to face 13.

Figure 2:
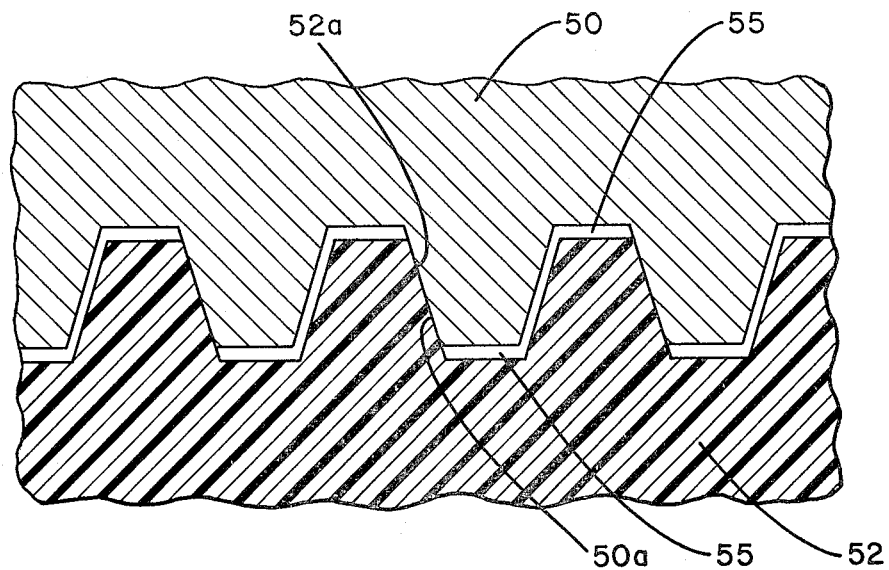
FIG. 2 is an enlarged partial sectional view of the lead screw assembly.
Figure 3:
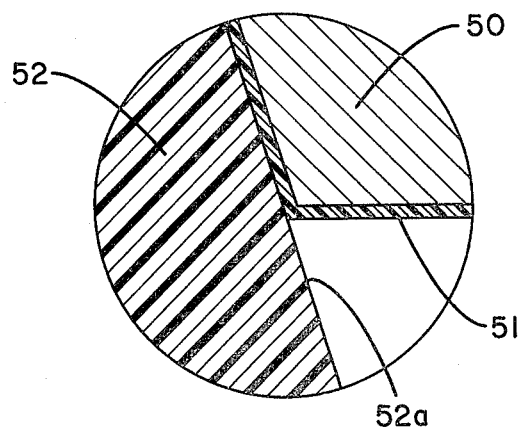
FIG. 3 is a further enlarged sectional view of a portion of FIG. 2.

As noted above, one side of the thread of screw 50 continuously engages one side of the thread of nut 52 against the spring bias applied to face 14. This is clearly shown in FIG. 2 where side 50a of the thread of screw 50 engages side 52a of the thread of nut 52. Lubricant, if used, would collect in the space 55 between the threads. The unidirectional loading of the threads caused by the spring bias plus the high humidity environment caused by proximity to the evaporator coil (not illustrated) would ordinarily cause corrosion of the screw 50 and/or nut 52 with the collection of the corrosion products in space 55 where they would constitute an abrasive causing wear of the screw 50 and/or nut 52. However, according to the teachings of this invention, the screw 50 is coated with a 0.8 to 1.2 mil layer of Teflon 51, as is best shown in FIG. 3, and nut 52 is made of nylon. Because screw 50 is overed with Teflon layer 51 which is impervious to the atmosphere, it is protected from the environment, does not require lubrication since Teflon is self-lubricating and has the mechanical strength of the underlying steel screw 50. The Teflon layer 51 would be peeled off but for the yielding of the nylon nut 52 which is of a compatible hardness relative to the Teflon and which deforms so as to spread the loading over all of its threads rather than just the first turn as is the case with a metal nut.

Although a preferred embodiment of the present invention has been illustrated and described, other changes will occur to those skilled in the art. It is therefore intended that the scope of the present invention is to be limited only by the scope of the appended claims.

What is claimed is:

1. A lead screw assembly for use in a humid environment under conditions of continuous unidirectional loading comprising:
    a lead screw;
    a solid polymeric coating on said lead screw which is impervious to humidity and which provides a low friction surface for said screw; and
    a deformable nut threadably engaging said coating on said screw and deforming under load so as to spread the load over all of the threads of said nut and thereby avoid peeling said coating from said screw.

2. The lead screw assembly of claim 1 wherein said coating is a 0.8 to 1.2 mil layer of polytetrafluorethylene and said nut is nylon.

* * * * *